(12) United States Patent
Nowatzyk

(10) Patent No.: US 7,123,211 B2
(45) Date of Patent: Oct. 17, 2006

(54) SURROUND-VISION DISPLAY SYSTEM

(75) Inventor: Andreas Nowatzyk, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 321 days.

(21) Appl. No.: 10/633,041

(22) Filed: Jul. 31, 2003

(65) Prior Publication Data
US 2005/0024320 A1 Feb. 3, 2005

(51) Int. Cl.
*G09G 5/00* (2006.01)
(52) U.S. Cl. .......................... 345/1.1; 345/31; 345/32; 345/46; 345/76; 359/464; 359/465; 359/466; 359/467; 359/468
(58) Field of Classification Search ................ 345/1.1, 345/31–32, 46, 76; 359/464–468
See application file for complete search history.

(56) References Cited

U.S. PATENT DOCUMENTS 4,689,604 A * 8/1987 Sokol .......................... 345/31
5,537,251 A * 7/1996 Shimada ...................... 359/462
6,798,570 B1 * 9/2004 Greenberg ................... 359/376
2004/0004844 A1 * 1/2004 Ryan, Jr. ...................... 362/545

* cited by examiner

*Primary Examiner*—Richard Hjerpe
*Assistant Examiner*—Leonid Shapiro

(57) ABSTRACT

A surround-vision display system with a very high visual dynamic range is made possible by distributing a limited number of LED's on the inside of a drum and then spinning that drum around a user. The pixel information for each horizontal position in space is sent to each corresponding LED it visits that position. The LED's are arranged in a grid on a panel tile, and the panel tile is tilted slightly, e.g., at 1.1-degrees. The result is each panel tile presents a continuous vertical stripe in the picture frame as all its LED's are swept by in the drum motion. Several panel tiles stacked vertically inside the drum all contribute to the whole height of the picture frame, e.g., several feet. The entire inside circumference of the drum is populated with the LED panel tiles to keep frame refresh rates up to avoid flicker while keeping drum rotation speeds down to reasonable levels. Thus even though the LED's and drum are moving, the image projected appears to be relatively stationary.

10 Claims, 5 Drawing Sheets

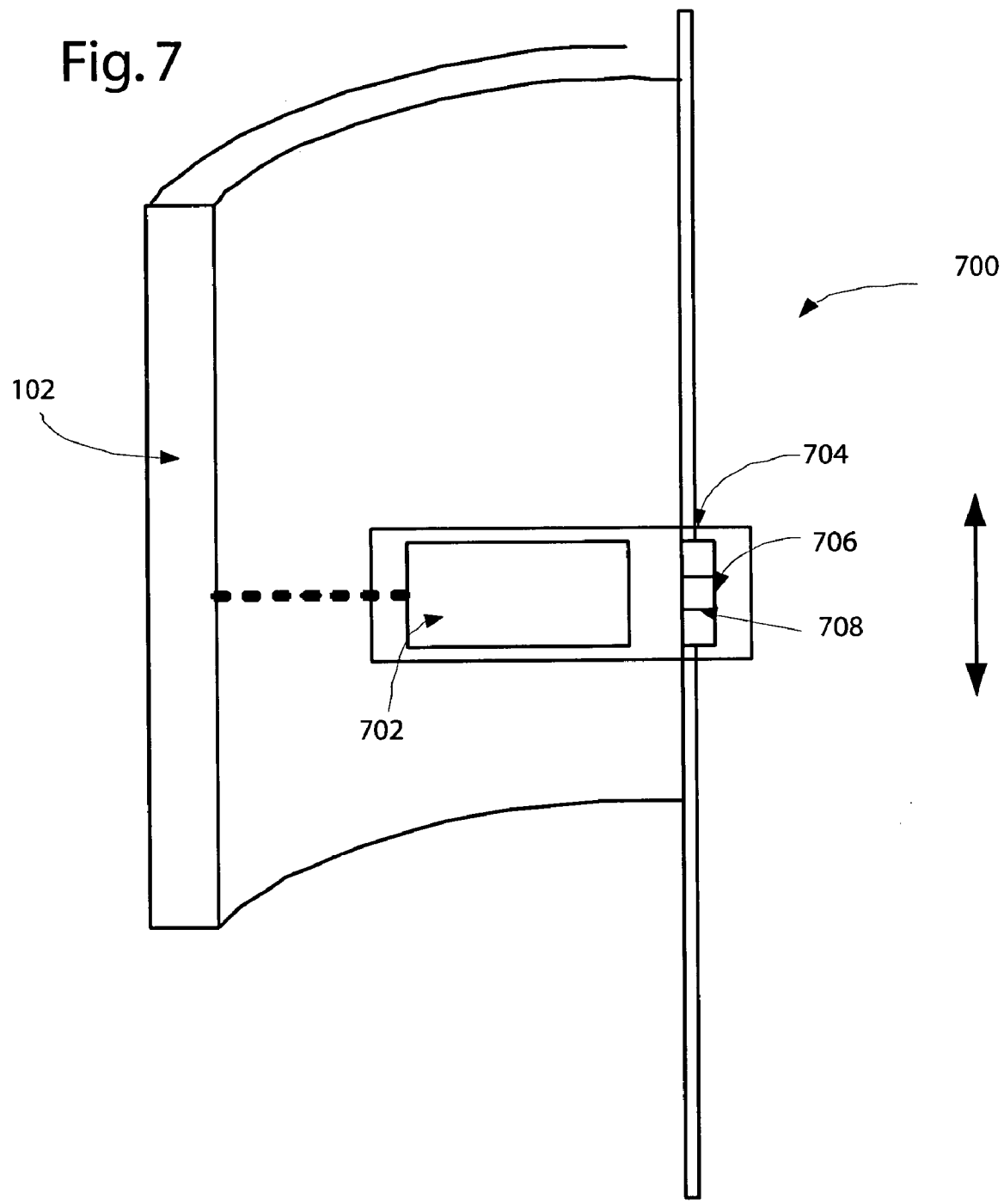

SURROUND-VISION DISPLAY SYSTEM

FIELD OF THE PRESENT INVENTION

The present invention relates broadly to a surround-vision display system, to a driver element for a light emitting source, and to a coupling unit for transferring data to and from a moving component. The present invention will be described herein, by way of example only, with reference to a light emitting diode (LED) display suited to flight simulators, virtual reality systems, movie special effects productions, telepresence and other high-end graphic applications.

BACKGROUND OF THE PRESENT INVENTION

Display devices are commonly characterized in terms of their spatial resolution, their dynamic range and their color range. In addition, there are several other important aspects of a display system that contribute to the realism of the presented image, for example artifacts stemming from a limited refresh rate, suppression of reflection of ambient light sources, and problems due to the fact that displays generally produce two-dimensional projections of three-dimensional objects. The visual acuity of the human eye exceeds the capability of conventional displays in all of these measures, and as such poses a tough challenge for display technologies aimed at photo realistic image and movie reproduction.

For example, standard cathode ray tube (CRT) displays fail to reach their 72 dpi ratings. The limited video bandwidth and large electron spot size in CRT's lead to much lower actual resolution. LCD display panels can reach their rated spatial resolutions, but doubling resolution it is problematic because smaller thin film transistors for each pixel limit the light output possible.

The human eye can adapt to a very wide range of lighting conditions. The range of interest for display devices is the lower part of photopic vision range, which provides good color perception and good spatial resolution. Because of the long time constants involved with adaptation, the simultaneous dynamic range of the human eye defines the desirable dynamic range of a display device, which is about 3.5 orders of magnitude.

Conventional displays feature a relatively small dynamic range. For example, the dynamic range of a typical CRT display is limited by many factors, including the limited bandwidth of the video drivers, optical reflections in the front faceplate, large electron spot size, and scattering from the shadow mask, for example. Projection systems suffer from the fact that the required objective lens itself has a limited dynamic range due to imperfect anti-reflection coatings. The net result is that most display systems achieve, at most, about two orders of magnitude less than what would be required to match the human eye.

Practical color display devices pick a set of three primary colors—red, green and blue—and are limited to reproducing the colors within a triangle defined by the color coordinates of these primary colors. The selection of the primary colors of a display device is subject to many technical limitations. For example, it is difficult to generate monochromatic light efficiently. If a white light source is used for the display, narrow band filters would waste a lot of light, hence projection and LCD displays tend to use primary colors quite far from the spectral boundary of human vision. Another factor concerning the primary blue and red colors is the diminishing sensitivity of the eye toward the end of the visible wavelength range.

In at least preferred embodiments, the present invention seeks to provide a surround-vision display system having one or more of improved spatial resolution, dynamic range, and color range than prior art display systems and circuitry suitable for use in such a surround-vision display system.

SUMMARY OF THE PRESENT INVENTION

In accordance with a first aspect of the present invention there is provided a surround-vision display system comprising a carrier structure having an internal circumferential surface, a motor unit for effecting continuous movement of the internal surface of the carrier structure with respect to an observer located at least partly within a volume defined by the internal surface of the carrier structure, a plurality of light emitting sources disposed as a two-dimensional array on the internal surface of the carrier structure, and a driver unit for the plurality of light emitting sources for driving each light emitting source depending on its vertical location and its current horizontal location.

Preferably, the two-dimensional array of light emitting sources being tilted with respect to a vertical line across the internal surface. Advantageously, the two-dimensional array of light emitting sources covers substantially the entire internal surface.

Preferably, the two-dimensional array of light emitting sources comprises a plurality of panel tiles, each panel tile mounted on a portion of the internal surface and having a two-dimensional sub-array of light emitting light sources mounted on its surface facing away from the internal surface of the carrier structure. In one embodiment, all tiles have an identical two-dimensional sub-array of light emitting sources.

Each panel tile may comprise a plurality of driver elements mounted thereon, with one driver element for each of the light emitting sources of the two-dimensional sub-array. Preferably, the driver elements are mounted on the surface of the panel tile facing the internal surface of the carrier structure.

In a preferred embodiment, the driver elements comprise pulse-width modulator structures for driving the light emitting sources.

Each panel tile preferably further comprises an I/O unit, a digital signal processor (DSP), and a memory unit for storing frame buffer data. The tiles may be arranged in one or more daisy chains, with each tile in one daisy chain being arranged as a repeater.

The surround-vision system may further comprise a control unit for supplying control data to the I/O units of the tiles. In one embodiment, the control unit is stationary with respect to the moving internal surface of the carrier structure, and the surround-vision system further comprises a coupling unit for coupling the control data from the control unit to the I/O units of the tiles.

In one embodiment, the coupling unit comprises a first micro-strip element disposed in a manner such that it moves correspondingly to the internal surface of the carrier structure, and a second, stationary micro-strip element disposed adjacent to a surface of the first, moving micro-strip element and separated by a continuous gap, wherein the first and second micro-strip elements are configured as a hybrid coupler.

In one embodiment, the system further comprises an aperture mask unit for sharpening a light emitting area of each LED. The aperture mask structure may comprise a plurality of aperture mask elements, each aperture mask element disposed to reduce the light emitting areas of a group of the LED's.

In accordance with a second aspect of the present invention, there is provided a pulse-width modulator (PWM) structure for driving a light emitting source, the PWM structure comprising at least two counter elements having different frequencies, a register element associated with each counter element via an associated comparator element, and an AND-gate element fed by the outputs of the comparator elements, whereby the output of the AND-gate provides a PWM driving signal for the light emitting source.

Accordingly, a required high frequency PWM signal can be provided utilizing counter elements having frequencies lower than the required high frequency.

In accordance with a third aspect of the present invention, there is provided a driver element for an LED, the driver element comprising a pulse-width modulator (PWM) structure for driving the LED, whereby an intensity of the LED is variable without wavelength shifts in the emission from the LED.

In accordance with a fourth aspect of the present invention, there is provided a coupling unit for transferring data to and from a moving component, the coupling unit comprising a first micro-strip element disposed in a manner such that it moves correspondingly to the component, and a second, stationary micro-strip element disposed adjacent to a surface of the first, moving micro-strip element and separated by a continuous gap, wherein the first and second micro-strip elements are configured as a hybrid coupler.

In one embodiment, the first and second micro-strips are substantially circular and each have a transceiving line cut at one point and configured for transmission signals being fed and/or received signals being drawn from one end of each transceiving line. Preferably, at least one of the micro-strips has its transceiving line cut at two or more points and further comprises a switch element for switching between the different sections of the transceiving line defined by the cuts in a receiving mode. Accordingly, errors in the received signal as a result of delays associated with travel time of the transmission signal around the transmission line can be reduced.

The foregoing and other objects, features, aspects and advantages of the present invention will become better understood from the detailed description provided herein below with appropriate reference to the accompanying drawings.

BRIEF DESCRIPTION OF THE DRAWINGS

FIG. 7 is a schematic diagram of a positioning system for use in the system of FIG. 1.

DETAILED DESCRIPTION OF THE EMBODIMENTS OF THE PRESENT INVENTION

Figure 1:
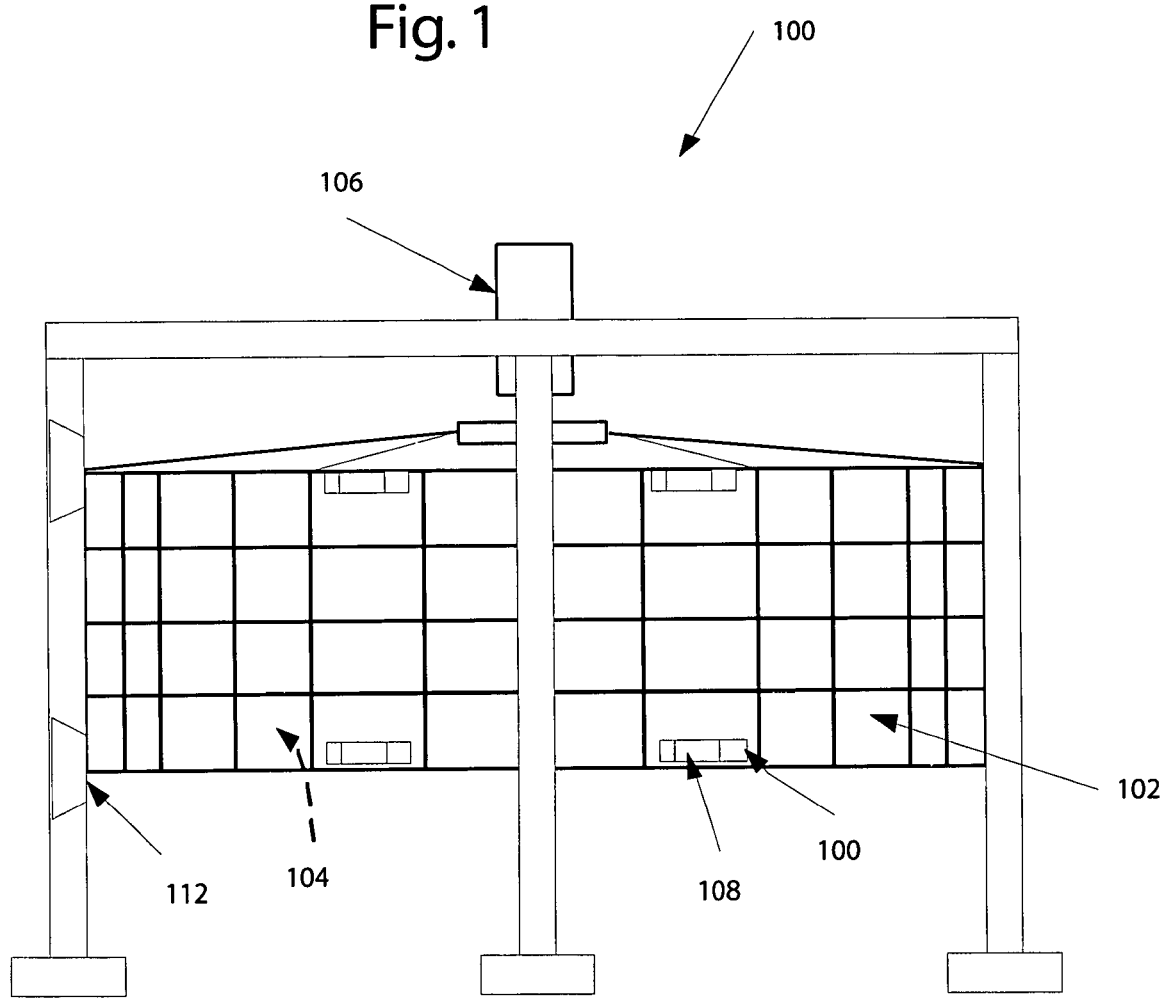
FIG. 1 is a schematic drawing showing a surround vision system according to an embodiment of the present invention.

FIG. 1 represents a LED surround-vision system embodiment of the present invention, and is referred to herein by the general reference numeral 100. The LED display system 100 includes a rotating drum 102 that is completely populated on its inside surface 103 with a number of LED tiles 104. The top of rotating drum 102 is suspended from a central drive assembly 106 that includes bearings, drive motor, and electrical connections to the rotating electronic assemblies. An observer (not shown) is located inside the rotating drum 102, preferably at or close to its centre axis, and in a manner such that the rotating drum 102 is positioned vertically around the central line of vision of the observer.

Several panel tiles stacked vertically inside the drum 102 all contribute to the whole height of the picture frame, e.g., several feet. The entire inside circumference 103 of the drum is populated with the LED panel tiles e.g. 104 to keep frame refresh rates up to avoid flicker while keeping drum rotation speeds down to reasonable levels. When the drum 102 and thus the LED's are moving, the image displayed to the observer (not shown) nevertheless appears to be stationary and a higher apparent resolution results from a limited number of LED's involved.

Figure 2:
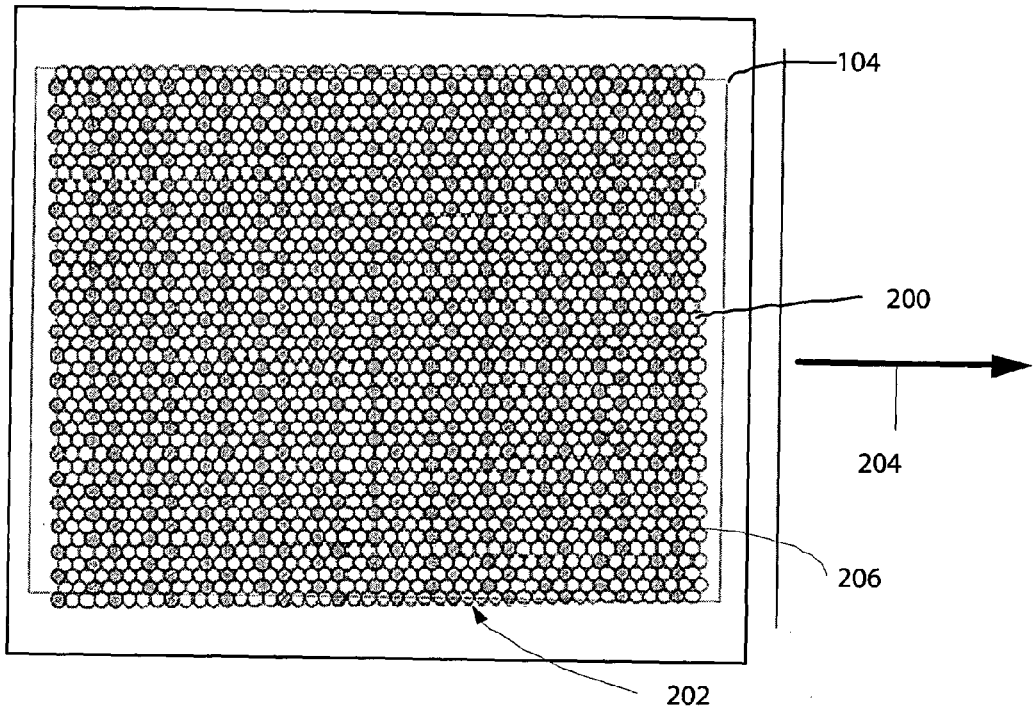
FIG. 2 is a schematic drawing of an LED panel tile of the system of FIG. 1.

FIG. 2 represents a single LED tile 104 with tightly packed individual LED's 200 in a honeycomb array 202. The honeycomb arrangement allows tight packing and smaller pitches between pixels. It will be appreciated by a person skilled in the art that as the drum 102 (FIG. 1) is rotated, as indicated by arrow 204 in FIG. 2, each LED tile 104 presents a plurality of vertically spaced, horizontal scan lines around the observer (not shown).

As shown in FIG. 2, the honeycomb array 202 is titled slightly, in the example embodiment at 1.1 degrees. As the result, each LED of the same color has a different vertical position, thus providing an improved vertical resolution compared with an un-tilted arrangement. Such are indicated as shaded LED sites, e.g. 206, of the LED tile 104.

None of the colors of commercially available LED's in small surface mount packages lie within the color range recommended by the Society of Motion Picture and Television Engineers (SMPTE). To improve the color range of the display system in the example embodiment, four primary light sources are used to reproduce color, rather than three primary light sources. This results in a color range which covers a much wider range than the SMPTE triangle. Furthermore, filters may be used to cover the DC and/or DG LED's in order to narrow the emission spectrum.

In some embodiments, unfiltered LED's would improve the yellow, orange, and red color range, but at the expense of lower green color range.

The hexagonal or honeycomb arrangement of array 202 maximizes the spacing between the conventionally packaged LED's 200, which in turn eases the design of an aperture mask in the example embodiment and described below. One tile 104 in the example embodiment has 506 pixels with four LED's each for a total of 2024 LED's 200. While 506 pixels is six short of a power of two, it has the advantage of allowing a panel with a proper aspect ratio i.e. enabling partial rows or columns of pixels to be avoided. In the example embodiment each tile 104 has forty-four columns and forty-six rows of LED's 200. The tiles 104 are not exactly rectangular, but a rhomboid, as a result of the slight tilt. Such facilitates seamless tiling vertically which maintains a constant vertical pixel pitch.

LED's of the four colors are interleaved so that the approximate LED distribution is constant for each color. Consequently, the vertical spacing of the horizontal scan lines for each of the four color components is also interleaved. In a conventional display system this would be considered undesirable because it leads to color fringes on edges with high contrast. These fringes are caused by the pixel abstraction. A pixel represents a specific two-dimensional point by its color and intensity. Such abstraction is useful for all aspects of digital image generation and processing. In the example embodiment, each color component has its own, slightly different pixel grid. If this is taken into account, it actually increases the spatial resolution.

The use of a different pixel grid for each color component in the example embodiment requires an extra processing step to compute the display pixel intensity for each color component from a source of idealized pixels. Such interpolation is also required in the example embodiment for the hexagonal scanning and to accommodate mechanical tolerances. The hexagonal array 202 is used to obtain the best spatial resolution from the available number of pixels. Together with interleaving the color components, the hexagonal array 202 has the effect of optimizing image reconstruction.

Table 1 represents the dimensions and other specifications of one practical embodiment of the present invention. The individual elements may be engineered to increase the frame rate, the vertical viewing angle, or to reduce the cost of the device, for example, in various other embodiments.

TABLE 1

Display Parameters

| Primary Parameter | Value | Derived Parameter | Value |
| --- | --- | --- | --- |
| RPM [1/min] | 60 | Pixel diameter [mm] | 0.290 |
| Radius [m] | 1 | Tile height [mm] | 148.93 |
| Update rate [frames/sec] | 32 | Display height [mm] | 595.73 |
| # of vertical tiles | 4 | # of horizontal pixels | 21,600 |
| # of vertical pixels | 512 | # of horizontal tiles | 32 |
| | | Tile width [mm] | 196.35 |
| | | LED density [1/cm2] | 5.2 |
| | | Pixel duration [µs] | 46.3 |
| | | Total # of tiles | 128 |
| | | Total # of LED's per color | 65,536 |
| | | Acceleration at cylinder Surface [g] | 4 |
| | | Total # of pixels | 44 M |

Figure 3:
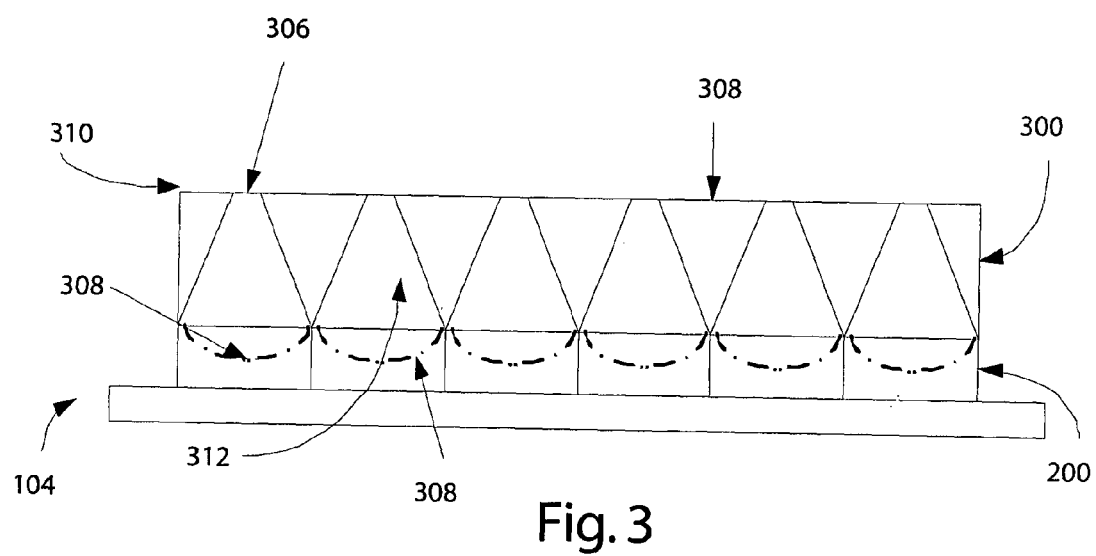
FIG. 3 is a schematic drawing, partly in section, of an aperture mask of the system of FIG. 1.

Each of the LED's 200 in the example embodiment is by itself too large to serve as a pixel, and an aperture mask 300 is used to reduce the light-emitting area of each LED 200, as shown in FIG. 3. In the example embodiment, the pixel diameter is about 0.3 millimeters at a distance of one meter, which is comparable to the LED die 302 size, but much smaller than the packaged LED 200. Furthermore, the LED die 302 is typically square with the top partially obscured by the bonding wire(s) and the electrode structures (not shown). Depending on the device type, a sizable fraction of the light is emitted from the sides of the die 302. Such light is subsequently reflected toward the output window by metal structures 304 within the package. It is also desirable that the pixel exhibits a Lambertian light distribution so that the apparent brightness of the display is independent of the viewing angle.

The LED aperture mask 300 of the example embodiment can be injection molded from a black, opaque plastic. Injection molding offers the required precision and uniformity. The aperture mask 300 includes one aperture hole 306 for each LED 200 on tile 104. The aperture mask 300 may be provided by a multiplicity of smaller masks element each covering groups of the LED's 200.

In order to maintain a high dynamic range, the top surface 308 of the aperture mask 300 is coated with a flat black light absorbing layer 310, such as Nextel's Black Velvet or equivalent. In addition, it is desirable that the top surface structure 308/310 is roughened and/or pitted. For example, prismatic depressions between the aperture holes 306 could considerably reduce residual reflections. By providing a black top layer 310, stray light will not be scattered towards the observer. Thus parts of the image that are intended to be black will actually appear solid black, regardless of the ambient lighting conditions.

In order to maximize light output, the inner walls 312 of the aperture mask 300 should not absorb light. In practice, this is difficult to achieve when taking into account the geometric capability of the system to transmit light, e.g., its optical "etendue". The numeric value of the etendue is a constant of the system and gets calculated as the product of the opening size and the solid angle that the system accepts light from. In most practical situations, it is approximated by integrating over the two factors, e.g., $G=\int\int dA*\Omega$. Because the etendue of the aperture hole 306 is much smaller than that of the LED 200, light loss is inevitable. The geometry of the aperture mask 300 and the coating of its inner surface 312 should preferably therefore be optimized to preserve as much light output as possible.

The aperture hole 306 in the example embodiment can be a little larger than the geometrical resolution suggests, due to the hexagonal scan pattern 202 (FIG. 2) and because of the interleaving of the color components. Such helps with preserving display brightness. Scaling up the size of the display will also increase the aperture hole 306 size, which in turn increases display brightness.

In the example embodiment, the aperture mask 300 is further used to compensate for the error introduced by using flat tiles 104 on a curved surface. The curved surface results in the pixels at the center of a tile 104 being closer to the observer than the pixels at the panel edge. Given a radius of one meter, this error is approximately 4.5 millimeters, which might be noticed by an off-center observer. To correct this problem, the aperture mask 300 is made thinner in the center, and is given a generally cylindrical surface toward the observer and a planar surface toward the tile 104. It will be appreciated by a person skilled in the art, that in the alternative embodiment, the tiles 104 could be curved by flexing them to fit the desired radius, provided a suitable arrangement/configuration of the LED's 200 and the aperture mask 300 to allow for the required flexing of the overall tile structure.

The light output of LED's 200 may be controlled over many orders of magnitude by the diode current. Unfortunately, the emission spectrum shifts in some LED's with the drive current. It has been recognized by the inventor, that pulse width modulation can be used to control this phenomena. Each LED 200 is either turned on or off completely (e.g. 0 or 20-mA), and the output intensity is a function of the on-time.

A pulse width modulator with the desired precision (16 bit) ordinarily involves a register that is compared to a digital counter running at an appropriate frequency. In the example embodiment, the counter would need to run at about 1-GHz. While this can be implemented using state-of-the-art ASIC solutions, in the example embodiment, commercially available field programmable gate arrays (FP- GA's) are employed. The use of these lower speed logic clocks also leads to a reduction in power consumption.

Figure 4:
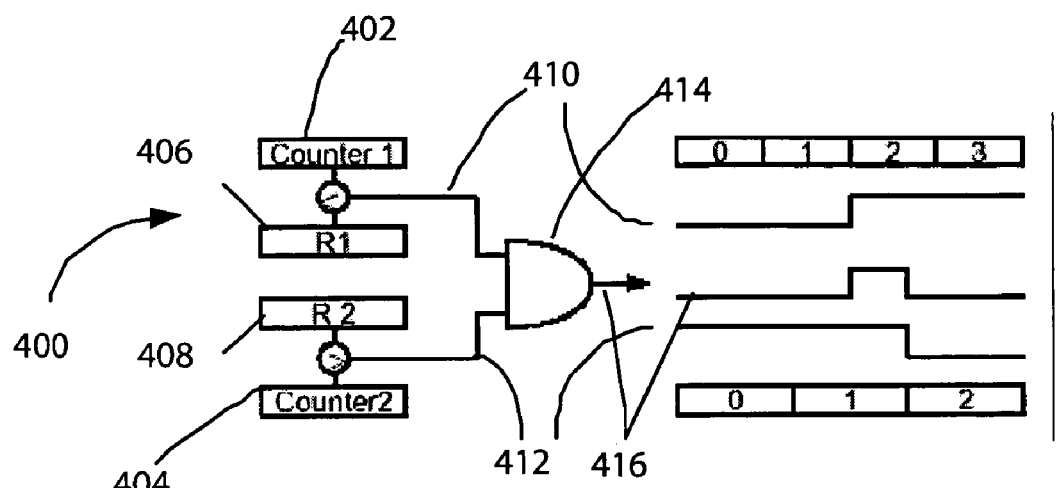
FIG. 4 is a schematic diagram of a digital pulse width modulator embodying the present invention.

FIG. 4 shows a schematic of a digital pulse width modulator (PWM) 400 of the example embodiment. The PWM 400 uses two counters 402, 404 that run at two different frequencies. A phase-locked loop circuit (not shown) is used to generate these two clocks from a common time base. In the example embodiment, counter 402 runs at 4 times the pixel rate while the second counter 404 operates at 3 times the pixel rate. Each counter 402, 404 is compared to a register 406, 408, which produces two PWM signals 410, 412, each synchronous to the corresponding clock 402, 404. The two PWM's 410, 412 are fed into a AND-gate 414 that produces the actual PWM output 416. In the example illustration in FIG. 4, the output 416 is turned on for ⅙ of the pixel period, which corresponds to the resolution of a conventional PWM running at 6 times the pixel rate.

Each LED 200 (FIG. 2) has one dedicated PWM similar to the one shown in FIG. 4. Several hundred of these PWM's are implemented in one FPGA, along with logic to reload the PWM control registers for each pixel. The layout of these PWM's will add some clock skew and output delays to the system which can be taken into account during the calibration of the system 100 (FIG. 1), described below. Note from Table 2 that the FPGA of the example embodiment runs at relatively low speeds, less than 50-MHz, which in turn minimizes heat generation. However, it is specifically noted that PWM's embodying the present invention can be implemented at higher speeds. For example, two clocks near 100-MHz can be used to approximate a PWM operating at well over 1-GHz. Accordingly, PWM's embodying the present invention can be utilized to approximate high frequency PWM operation using two or more lower frequency clocks.

TABLE 2

PWM Performance

| Parameter | Value |
|---|---|
| Pixel Clock (Hz) | 21,600 |
| Clock1 (=2048*PC) [MHz] | 44.2366 |
| Clock2 (=2047*PC) [MHz] | 44.2152 |
| Resolution [bits] | 16 |
| Max. Absolute error | 0.00025385 |
| Max. Relative error [%] | 0.09622 |

While some FPGA output drivers are capable of driving an LED directly, it is not practical to drive hundreds of high power outputs simultaneously from one chip. The typical LED operating current is 20-mA, which is high compared to normal logic loads. In the example embodiment a bipolar transistor and a resistor are added for each LED to build a switchable current source. Each type of LED has a separate regulated power supply which serves to reduce switching noise and increase efficiency. The latter can be important: One tile 104 (FIG. 2) has approximately 2000 LED's requiring a total of 40 A of peak current. At 3.3 V, this is about 120 W. However, half of the LED's need only about 1.3 to 1.5 V, so that is a near 50% reduction in power consumption potential by using multiple power regulators.

Figure 5:
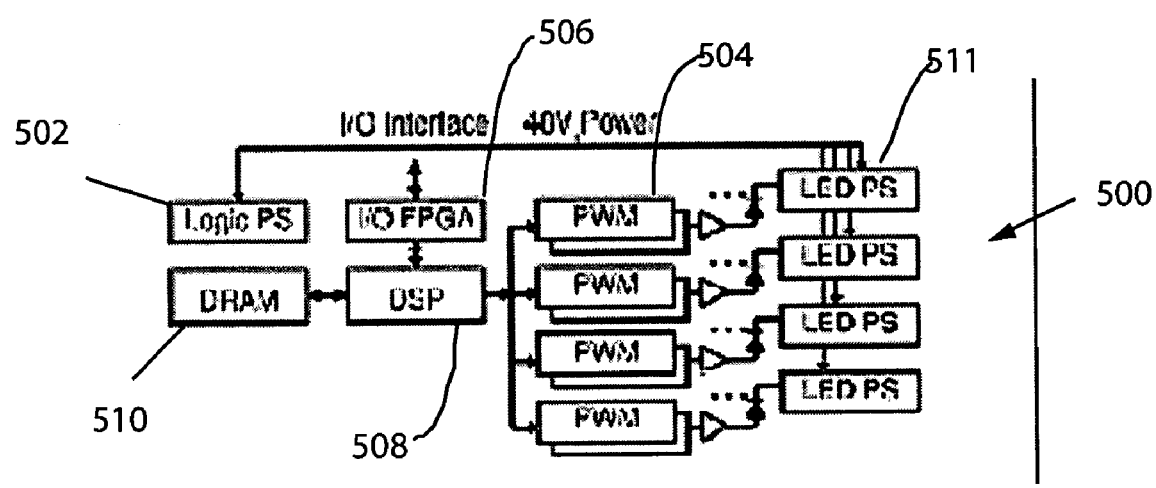
FIG. 5 is a schematic diagram of LED panel electronics of an embodiment for use in the system of FIG. 1.

Each LED tile 104 (FIG. 2) includes all required circuitry to drive its LED's. FIG. 5 shows the circuitry 500 used in the example embodiment. The circuitry 500 includes a logic power supply unit 502, LED PWM's 504, an I/O FPGA 506, a digital signal processor 508, DRAM 510 for the frame buffer and calibration tables and LED power supply units 511. In the example embodiment, these components, are physically mounted on the reverse side of each tile 104 (FIG. 2).

The circuitry 500 is powered by an external 48V DC source (not shown). Such power is supplied from the hub (see below) and is not tightly regulated. In the example embodiment, five on-board regulators (not shown) convert this power to appropriate voltages to drive the logic and the LED's (supply units 502, 511). Appropriate converters are available with more than 90% efficiency. Using a higher supply voltage reduces the weight required for cables and increases overall efficiency. Alternatively, a 300V DC system may be used, which is also a common industry standard.

The I/O FPGA 506 controls transferring data to and from each tile. Data may be read from the tile for diagnostic purposes, however this data-path is not typically used much during normal operations and does not need to be fast. The bulk data flow is from the driving data source to the tile, i.e. to the circuitry 500.

Each DRAM 510 holds a part of an overall virtual frame buffer. Such buffer overlaps with adjacent panels to permit interpolation and to accommodate mechanical tolerances in the example embodiment. Because each panel rotates around the observer, it must hold all 21,600 horizontal pixels for each scan line in the example embodiment. Thus, each DRAM 510 stores 512×21,600 pixels of 3×16 bits (X, Y, Z) each, for a total of 64 Mbytes. The I/O FPGA 506 in the example embodiment is able to update this data at a rate of 32 frames a second, so a sustainable data rate of 2-GB/sec is required. A signaling rate of 622 Mb/sec is well below the cutting edge technology, for example commercially available FPGA's offer up to 80 high speed I/O cells each running at 840-Mb/sec. Using 622 Mb/sec connections, the I/O devices require 32 wires per panel. Such data path is broadcast to all panels of the same elevation. Given the high speed nature of these connections, each panel acts as a repeater so that this data path uses only unidirectional, point to point connections. Panels are joined at their vertical edges with short ribbon cables. The first panel in this daisy chain is connected to the hub. Given that there are 4 panels stacked vertically, only 4 data connections run from the assembly 106 (FIG. 1) to the panels.

The digital signal processor 508 reads the frame-buffer data and performs the interpolation step to get the momentary intensity value for a particular LED. Each LED has an individual correction table that takes care of manufacturing tolerances. The interpolation coefficient and this table are also stored in the on-board memory. The result of this computation is then loaded into the pulse width modulators 504. All processing steps form a regular, deterministic, data-independent pipeline that is controlled by a global pixel clock, which in turn is derived from a high precision, incremental encoder that keeps track of the rotational position.

There are 506 PWM's for each of the four color components on each panel in the example embodiment. 253 PWM's fit comfortably into one medium sized FPGA. Therefore, there are a total of 8 FPGA's for the PWM logic. By area, the largest contribution to the panel electronics are the LED drivers. Alternative to the discrete transistor approach mentioned above for the example embodiment, PC board area may be saved by using certain buffer ICs.

Each tile uses the dedicated DSP chip 508 to translate the image data from the virtual frame-buffer (DRAM 510) to the PWM-setting that controls the LED on-time. In general, the actual pixel (=LED aperture) is located inside a square that is formed by four pixels in the virtual frame buffer. One pixel in the virtual frame buffer is represented by the tristimulus value x,y,z that uniquely defines any perceptible color and intensity. Other operation modes are possible, for example using a RGB representation with idealized, primary color coordinates. Representations that require complex color transformations may have to be carried out in a front-end prior to writing the data into the virtual frame buffer. The other characteristic of the virtual frame buffer of the example embodiment is that it uses the conventional square pixel approximations. To get a good interpolation to the actual pixel position, a 4×4 neighborhood is used. Such requires sixteen multiply-and-add operations per LED and per pixel. Because there are four actual, hexagonal pixel arrays that are interleaved, each LED has its own set of sixteen coefficients, which are derived from the actual aperture position, the LED color coordinates and the conversion gain. Under the assumptions listed in Table 1, this requires 699,494,400 multiply-and-add operations per second. A high end DSP chip can easily handle this computational load, given that the data access pattern is totally regular and predictable. In the example embodiment, all computation can be carried out in sixteen bit fixed point precision and 32 bit registers to hold intermediate results.

In addition to the 4×4 convolution, there are a number of other operations to be carried out by the DSP. They include the address computation, and the conversion of the desired LED intensity into a control word to the PWM array. Also, the DSP has to write the PWM control words to the PWM array. Such requires a read-bandwidth from the memory of approximately 3.4 Gbytes/sec, which requires a reasonably wide SDRAM interface using DDR signaling. The memory (DRAM 510) is split into two separate banks. One for the virtual frame buffer (32-MB); and the other for a table of coefficients, address offsets, and PWM conversion tables (0.5-MB). The coefficient memory may use static memory technology because of its smaller size and less frequent access.

Figure 6A:
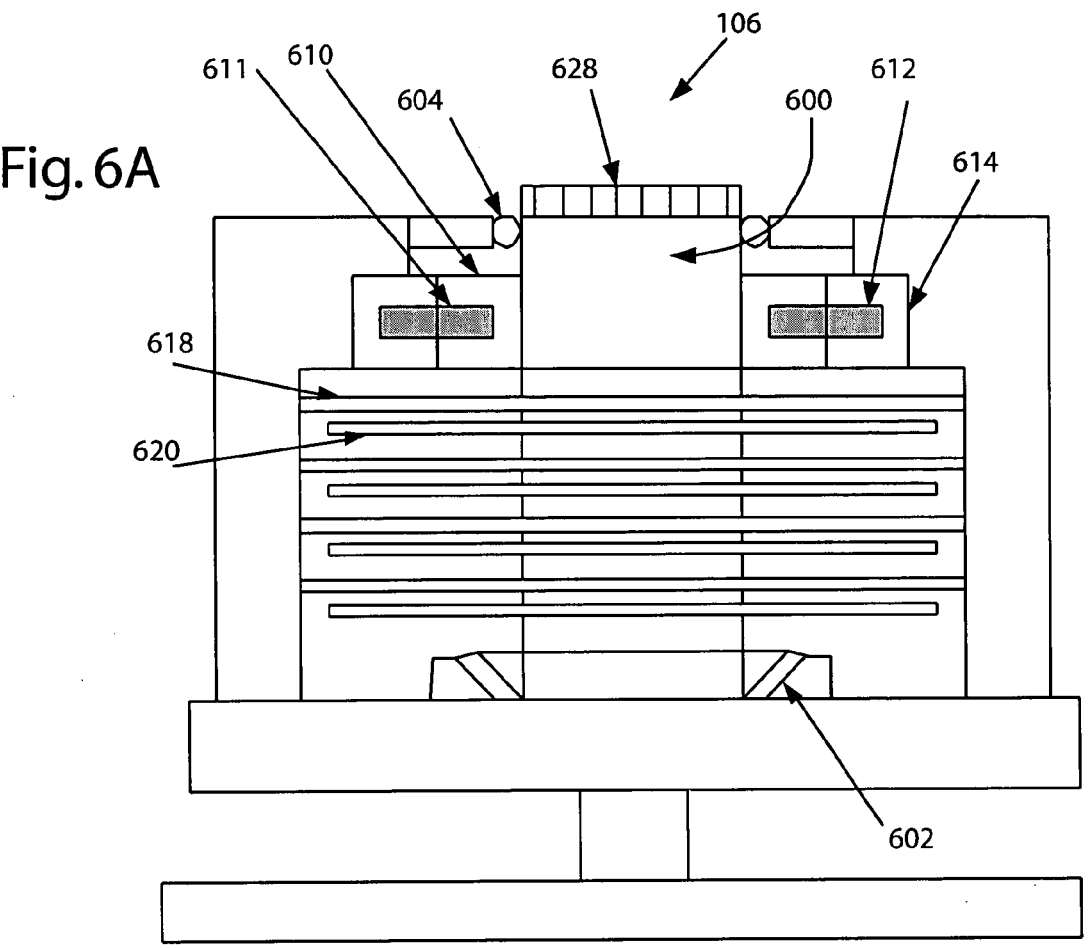
FIGS. 6A, B and C are diagrams, partly in section, showing the mechanical, power and data coupling in the system of FIG. 1 and embodying the present invention.

FIG. 6A shows the major components of mounting assembly 106 of the surround-vision system 100 (FIG. 1). The central shaft 600 is supported by two precision mechanical bearings 602, 604. The bottom thrust bearing 602 carries the axial load of the display cylinder 102 (FIG. 1), while the top bearing 604 ensures axial centricity, which is important for the proper functioning of the active components. The coupling between the shaft 600 and the display cylinder 102 (FIG. 1) is partially flexible since a totally rigid construction would be too heavy and fragile. The central shaft 600 is hollow to accommodate power and data connections.

It is desirable that the assembly 106 operates quietly, therefore gears, timing belts, and similar components are avoided in the example embodiment in favor of a direct drive system using a low-rpm, high torque, brushless DC torque motor (not shown). The motor is integrated directly into the assembly 106 without any additional bearings and mechanical couplings.

As such, there are no other components in mechanical contact with the rotating cylinder 102 (FIG. 1) besides the two precision bearings 602, 604. Given the rather low rotation rate, high performance precision bearings produce very little operating noise. Alternatively, air bearings could be used, avoiding mechanical contact altogether.

Power is supplied to the rotating section of the assembly 106 (i.e. to the cylinder 102, see FIG. 1) via a transformer coupling. Attached to the shaft 600 is a radial assembly of U-shaped ferrite cores 610 which hold the secondary winding 611 of a high frequency, coaxial power transformer. The stationary, primary winding 612 is enclosed in another radial set of U-shaped ferrite cores 614 that complete the magnetic circuit. The use of multiple U-shaped cores 610, 614 enables the transformer in the example embodiment to handle approximately 15-kW. Both primary and secondary winding/core assemblies are rigidly potted with electronic grade epoxy resin. The surface of the ferrite material is precision turned to minimize the air-gap between the stationary and rotating sections. Aluminum plates are used to shield stray magnetic field from the other electronic components. Advantageously, the transformer should operate at or above 20-KHz, so that the magetorestrictive noise is beyond the audible range.

Figures 6B, 6C:
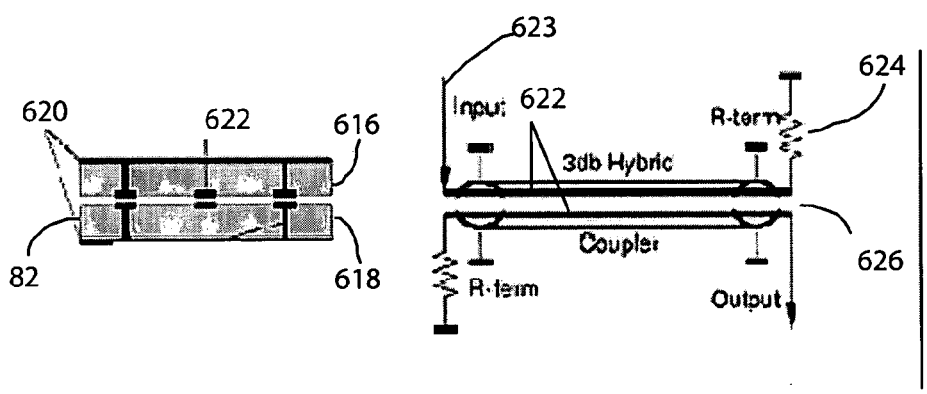

Transmitting data to and from the rotating section in the example embodiment uses planar assemblies of micro-strip hybrid couplers. The total required bandwidth in the example embodiment is: 4 sets of 32 high-speed wires needed to transmit 8 gigabytes per second to the rotating section. The micro-strip hybrids are each formed by two circular printed circuit boards, e.g. 616, 618, one stationary 616 and one rotating 618, that face each other. FIG. 6B shows a cross-section of one coupler. Each PC board 616, 618 has a solid, copper ground plate 620 on one side and a circular transceiver line 622 on the other side. The circular transceiver line 622 is cut at one point so that the signal propagates once around the shaft 604 (FIG. 6A) in a nearly closed, C-shaped trace. As illustrated in FIG. 6C, the signal 623 is injected at one end of this trace 622, which is terminated with a resistor 624 at the other end. The signal side of the two PC-boards 606, 608 are separated by a small air gap 626, which is small compared to the thickness of the dielectric PC board 606, 608 material. Such configuration acts as an hybrid coupler.

In order to use this device to transmit data in the example embodiment, a few issues were addressed. The first is that the coupler operates only over a limited bandwidth range. Since no DC signals are coupled through this device data must use a DC-free, run-length limited encoding, such as the common 8b/10b format used in fiber-channel, 1000b/T Ethernet. A 800 Mbit/s 8b/10b signal requires a bandwidth of approximately 100 to 400 MHz, which is within reach of a hybrid coupler.

The second issue arises from the fact that one half of the coupler is rotating, which causes a variable phase shift. Such shift by itself is not a problem, however there will be inter-symbol interference when the two parts of the coupler are not aligned. The worst case arises when they are 180 degree rotated with respect to each other. In this case, half of the output signal has travel once around the shaft, while the other half has not. The delay for a signal to travel once around the shaft is larger than one bit time, so that the resulting signal is composed of two components equal in amplitude but delivered at two different times, differing by several bit-times. Clearly, this cannot be received correctly. To avoid this problem, in the example embodiment the transceiver line of the moving board 618 is cut in half so that there are two receive micro-strips, each covering one half of one rotation. An electronic switch is used to alternate between the two couplers depending on the angular position of the display cylinder. Each half coupler receives about one-quarter of the original signal, so there is some amplification required, which can be combined along with the switch electronics. Data transmission is packetized and no packet is sent during the short switch-over period. It will be appreciated by the person skilled in the art, that the delay consideration described above relates to the example embodiment described. In alternative embodiments, the transceiver line of the moving board may not have to be cut to avoid differing bit-times, or may be cut at more than one place, depending on the specific delay time calculations.

Returning to FIG. 6A, a further component attached to the shaft 600 is an incremental position sensor 628 which uses a radial optical grating and a pair of photoelectric sensors. A sensor operating at 2048 cycles per revolution is sufficient for the example embodiment, although it is possible to employ a high-end encoder in the example embodiment that has sub-arc second angular resolutions. The signal from the encoder is a constant square-wave, which can be fed into PLL to synthesize the pixel clock and all other timing signals. Such signal can also control the drive motor. In order to improve display stability or jitter caused by the apparent horizontal movement of the pixels, the timing is preferably derived from the mechanical position. The drive servo loop is relatively soft, so that the mass of the cylinder provides damping.

Returning now to FIG. 1, in the example embodiment, dynamic balancing is built into the display system. Two sets of four weights, e.g. 108, are attached to the top and bottom of the rotating cylinder 102. These can be moved radially by a small, computer controlled servo-motor, e.g. 110. A non-contacting position sensor 112 observes the radial position of the bottom and the top rim of the display cylinder 102. Any wobble during operation is measured, and then minimized by adjusting the weight positions.

Mechanical imperfections in pixel alignment can be accounted for by an initial calibration. Due to the size of the example embodiment system 100, and the number of pixels on each LED tile 104, it is not practical to align over a hundred panels with sub-pixel precision. Instead the actual pixel position is measured with an optical scanning device during an initial calibration phase. Such data is subsequently used to interpolate the display pixel intensity from an idealized frame buffer using conventional pixels on a rectangular grid. The calibration system in the example embodiment consists of a vertical, linear positioning system 700 that is placed at the center of the display cylinder 102 during calibration and is shown in FIG. 7. Such positioner moves a horizontally mounted telescope 702 up and down so that the telescope 702 can scan the vertical extent of the display surface. The rotation of the display cylinder 102 provides the means to scan along the horizontal axis.

There are three sensors in the focal plane of the calibration telescope, a fast photo-detector 704, a spectrometer 706, and a slow photo-detector 708. The fast photo-detector 708 senses the exact pixel position and includes a small aperture and photomultiplier tube (PMT) (not shown). The spectrometer 706 determines the exact color coordinates of each pixel. In the example embodiment, the spectrometer 706 is an off-the-shelf, commercial device that uses a grating and a linear array of photo-diodes to measure the spectral distribution of a light source. The slow photo-detector 708 measures the individual pixel intensity and does so by measuring the linearity of the LED intensity as a function of the digital PWM input. Such approach is desirable because neither the fast photo-detector 704 nor the spectrometer 706 have the required dynamic range and linearity.

Although the present invention has been described with reference to the preferred embodiments, it will be understood that the present invention is not limited to the details described thereof. Various substitutions and modifications have been suggested in the foregoing description, and others will occur to those of ordinary skill in the art. Therefore, all such substitutions and modifications are intended to be embraced within the scope of the present invention as defined in the appended claims.

The invention claimed is:

1. A surround-vision display system comprising: a carrier structure having an internal circumferential surface: a motor unit for effecting continuous movement of the internal surface of the carrier structure with respect to an observer located at least partly within a volume defined by the internal surface of the carrier structure; a plurality of light emitting sources disposed as a two-dimensional array on the internal surface of the carrier structure wherein the two-dimensional array of light emitting sources comprises a plurality of panel tiles, each panel tile mounted on a portion of the internal surface and having a two-dimensional sub-array of light emitting light sources mounted on its surface facing away from the internal surface of the carrier structure: and a driver unit for the plurality of light emitting sources for driving each light emitting source depending on its vertical location and its temporary horizontal location.

2. The system of claim 1, wherein all tiles have an identical two-dimensional sub-array of light emitting sources.

3. The system of claim 1, wherein each panel tile comprises a plurality of driver elements mounted thereon, with one driver element for each of the light emitting sources of the two-dimensional sub-array.

4. The system of claim 3, wherein the driver elements are mounted on the surface of the panel tile facing the internal surface of the carrier structure.

5. The system of claim 3, wherein, the driver elements comprise pulse-width modulator structures for driving the light emitting sources.

6. The system of claim 1, wherein each panel tile further comprises an I/O unit, a digital signal processor (DSP), and a memory unit for storing frame buffer data.

7. The system of claim 1, wherein the tiles are arranged in one or more daisy chains, with each tile in one daisy chain being arranged as a repeater.

8. The system of claim 6, wherein the surround-vision system further comprises a control unit for supplying control data to the I/O units of the tiles.

9. A surround-vision display system, comprising: a rotatable drum with an inside surface viewable by a user; a plurality of LED's arranged on said inside surface that together rotate in a vertical stack of horizontal circular orbits around said user wherein the plurality of LED's are arranged on said panel tiles in a grid set with its rows on an angle with respect to said horizontal circular orbits such that each LED orbits in uniformly spaced parallel circular orbits; a picture-frame pixel distributor connected to supply pixel information to a corresponding one of the plurality of LED's according to its position in said vertical stack and its instantaneous position in its flight in its horizontal circular orbit around said user; and a pulse-width modulator connected to a corresponding one of the plurality of LED's and proving for modulated light intensity levels and minimal color shifts otherwise dependent on LED current levels; wherein, when the LED's and drum are moving, the image projected nevertheless appear to be stationary and a higher apparent resolution results from a limited number of LED's involved.

10. A method of surround-vision display with a very high visual dynamic range, comprising: distributing a limited number of LED's on the inside of a drum and then spinning that drum around a user wherein the step of distributing is such that several panel tiles are stacked vertically inside the drum to all contribute to a whole height of a picture frame; wherein, pixel information for each horizontal position in space is sent to each corresponding LED that visits that position; and wherein, even though the LED's and drum are moving, a projected image appears to be relatively stationary.

* * * * *